US011416171B2

(12) United States Patent
Benisty et al.

(10) Patent No.: US 11,416,171 B2
(45) Date of Patent: Aug. 16, 2022

(54) DYNAMIC PREDICTIVE LATENCY ATTRIBUTES

(71) Applicant: Western Digital Technologies, Inc., San Jose, CA (US)

(72) Inventors: Shay Benisty, Beer Sheva (IL); Ariel Navon, Revava (IL); Alexander Bazarsky, Holon (IL); Judah Gamliel Hahn, Ofra (IL)

(73) Assignee: Western Digital Technologies, Inc., San Jose, CA (US)

( * ) Notice: Subject to any disclaimer, the term of this patent is extended or adjusted under 35 U.S.C. 154(b) by 9 days.

(21) Appl. No.: 16/736,719

(22) Filed: Jan. 7, 2020

(65) Prior Publication Data

US 2021/0208812 A1 Jul. 8, 2021

(51) Int. Cl.
*G06F 3/06* (2006.01)

(52) U.S. Cl.
CPC .......... *G06F 3/0659* (2013.01); *G06F 3/0611* (2013.01); *G06F 3/0653* (2013.01); *G06F 3/0673* (2013.01)

(58) Field of Classification Search
None
See application file for complete search history.

(56) References Cited

U.S. PATENT DOCUMENTS 11,204,883 B1 * 12/2021 Goss ..................... G06F 3/0659
2017/0177487 A1 * 6/2017 Ware ................... G06F 13/1689
2018/0059944 A1 3/2018 Helmick et al.
2019/0042150 A1 2/2019 Wells et al.
2019/0042413 A1 2/2019 Wysocki et al.
2019/0050161 A1 * 2/2019 Wysocki ............. G06F 11/1008
2019/0079680 A1 3/2019 Canepa et al.
2020/0004456 A1 * 1/2020 Williams .............. G06F 9/3855
2021/0221402 A1 * 7/2021 Nakamura ........ B60W 60/0015

OTHER PUBLICATIONS

Seonbong Kim et al;"Optimized I/O Determinism for Emerging NVM-based NVMe SSD in an Enterprise System", Proceedings of the 55th Annual Design Automation Conference, ACM, Jun. 24, 2018 (6 pages).
Myoungsoo Jung et al., "HIOS: A Host Interface I/O Scheduler for Solid State Disks"; ACM SIGARCH Computer Architecture News, IEEE, vol. 42, No. 3, pp. 289-300; Jun. 14, 2014 (12 pages).

* cited by examiner

*Primary Examiner* — Ernest Unelus
*Assistant Examiner* — Dayton Lewis-Taylor
(74) *Attorney, Agent, or Firm* — Patterson + Sheridan, LLP; Steven H. VerSteeg

(57) ABSTRACT

The present disclosure generally relate to dynamically changing predictive latency related attributes to increase the deterministic window (DTWIN) of operation. The host device workload characteristics as well as the memory device's current condition provide valuable information for the duration of the DTWIN. If the memory device is near the end of life, then the DTWIN duration will be smaller. Additionally, if the workload from the host device is heavy, then the DTWIN duration will also be smaller. Rather than utilizing a fixed DTWIN duration based upon worst case scenarios for host device workload and memory device condition, dynamically adjusting the DTWIN duration based upon the workload and condition will provide a DTWIN duration that can gradually decrease over time from a much longer DTWIN duration than is currently available.

20 Claims, 5 Drawing Sheets

100
HOST DEVICE 102
INTERFACE 106
HOST STATISTICS COLLECTOR 116
CONTROLLER 108
MEMORY DEVICE INTERFACE 112
MEMORY DEVICE 110
HOST LOG GENERATOR 114
DATA STORAGE DEVICE 104

NDWIN 202

DTWIN 204

NDWIN 206

DTWIN 208

NDWIN 210

DTWIN 212

NDWIN 214

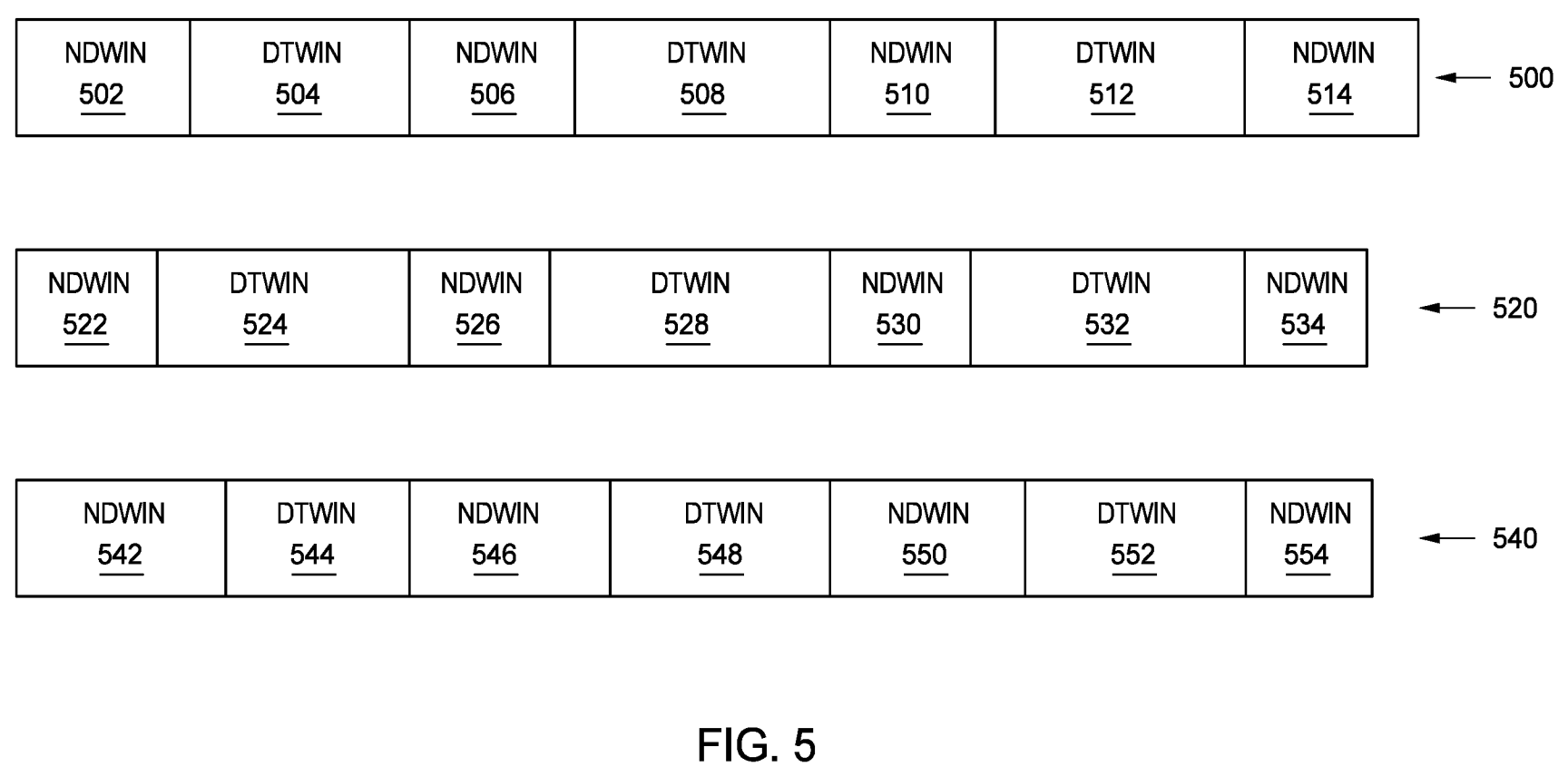

NDWIN 502
DTWIN 504
NDWIN 506
DTWIN 508
NDWIN 510
DTWIN 512
NDWIN 514

520

NDWIN 522
DTWIN 524
NDWIN 526
DTWIN 528
NDWIN 530
DTWIN 532
NDWIN 534

540

NDWIN 542
DTWIN 544
NDWIN 546
DTWIN 548
NDWIN 550
DTWIN 552
NDWIN 554

FIG. 5

DYNAMIC PREDICTIVE LATENCY ATTRIBUTES

BACKGROUND OF THE DISCLOSURE

Field of the Disclosure

Embodiments of the present disclosure generally relate to dynamically changing predictive latency related attributes to increase the deterministic window (DTWIN) of operation.

Description of the Related Art

Predictable-Latency-Mode (PLM) is used to achieve predictable latency for both read and write operations in NVMe devices. When an NVMe device is configured to operate in this mode, using the Predictable Latency Mode Config Feature, the namespaces in an NVM set provide distinctive separate windows of operation for deterministic operation and for non-deterministic operation. One such distinctive window is the deterministic window (DTWIN), which is the window of operation during which the NVM set is able to provide deterministic latency for read and write operations. Another such distinctive window is the non-deterministic window (NDWIN), which is the window of operation during which the NVM set is not able to provide deterministic latency for read and write operations as a result of preparing for a subsequent deterministic window.

Example actions that may be performed in the NDWIN include background operations on the non-volatile media. The current window that an NVM set is operating in is configured by the host using the PLM window feature, or by the controller as a result of an autonomous action.

The predictable latency per NVM get log page may be used to determine the current window for the specified NVM set. There is one log page for each NVM set when PLM is supported. The log page indicates typical values and reliable estimates for attributes associated with the DTWIN, and the NDWIN of the specified NVM Set. For reads, writes, and time in the DTWIN, two values are provided in the predictable latency per NVM get log page: a typical or maximum amount of that attribute that the host may consume during any given DTWIN; and a reliable estimate of the amount of that attribute that remains to be consumed during the current DTWIN.

To remain in the DTWIN, the host device is required to follow operating rules ensuring that certain attributes do not exceed the typical or maximum values indicated in the predictable latency per NVM get log page. If the attributes exceed any of the typical or maximum values indicated in the predictable latency per NVM get log page or a deterministic excursion occurs, then the associated NVM Set may autonomously transition to the NDWIN. A deterministic excursion is a rare occurrence in the NVM subsystem that requires immediate action by the controller.

DTWIN is a constraint on quality of service (QoS) for the data storage device because the data storage device is forced to work in the worst-case scenarios by assuming the memory device is in end-of-life (EOL) conditions. Additionally, the data storage device still has a massive workload on the host interface. Therefore, the worst case scenario for the host workload must be assumed as well. Those constraints decrease the DTWIN, and increase the NDWIN in most circumstances.

Therefore, there is a need in the art for improvement in DTWIN for storage devices.

SUMMARY OF THE DISCLOSURE

The present disclosure generally relate to dynamically changing predictive latency related attributes to increase the deterministic window (DTWIN) of operation. The host device workload characteristics as well as the memory device's current condition provide valuable information for the duration of the DTWIN. If the memory device is near the end of life, then the DTWIN duration will be smaller. Additionally, if the workload from the host device is heavy, then the DTWIN duration will also be smaller. Rather than utilizing a fixed DTWIN duration based upon worst case scenarios for host device workload and memory device condition, dynamically adjusting the DTWIN duration based upon the workload and condition will provide a DTWIN duration that can gradually decrease over time from a much longer DTWIN duration than is currently available.

In one embodiment, a data storage device comprises: at least one memory device; and a controller coupled to the at least one memory device, the controller configured to: collect statistics regarding host device usage of the data storage device; collect statistics regarding parameters of the at least one memory device; determine deterministic window (DTWIN) duration for the data storage device based upon the collected statistics; and deliver the DTWIN duration to at least one host device.

In another embodiment, a data storage device comprises: a plurality of memory devices; and a controller coupled to the plurality of memory devices, the controller configured to: logically arrange the plurality of memory devices into a first plurality of memory device sets; determine first deterministic window (DTWIN) duration for each memory device set of the first plurality of memory device sets; logically rearrange the plurality of memory devices into a second plurality of memory device sets; and determine a second DTWIN duration for each memory device set of the second plurality of memory device sets.

In another embodiment, a data storage device comprises: means to dynamically adjust deterministic window (DTWIN) duration for at least one memory device; and means to deliver the DTWIN duration to at least one host device.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 2 is a schematic illustration of DTWIN duration and NDWIN duration according to one embodiment.

FIG. 5 is a schematic illustration of a memory device set according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relate to dynamically changing predictive latency related attributes to increase the deterministic window (DTWIN) of operation. The host device workload characteristics as well as the memory device's current condition provide valuable information for the duration of the DTWIN. If the memory device is near the end of life, then the DTWIN duration will be smaller. Additionally, if the workload from the host device is heavy, then the DTWIN duration will also be smaller. Rather than utilizing a fixed DTWIN duration based upon worst case scenarios for host device workload and memory device condition, dynamically adjusting the DTWIN duration based upon the workload and condition will provide a DTWIN duration that can gradually decrease over time from a much longer DTWIN duration than is currently available.

Figure 1:
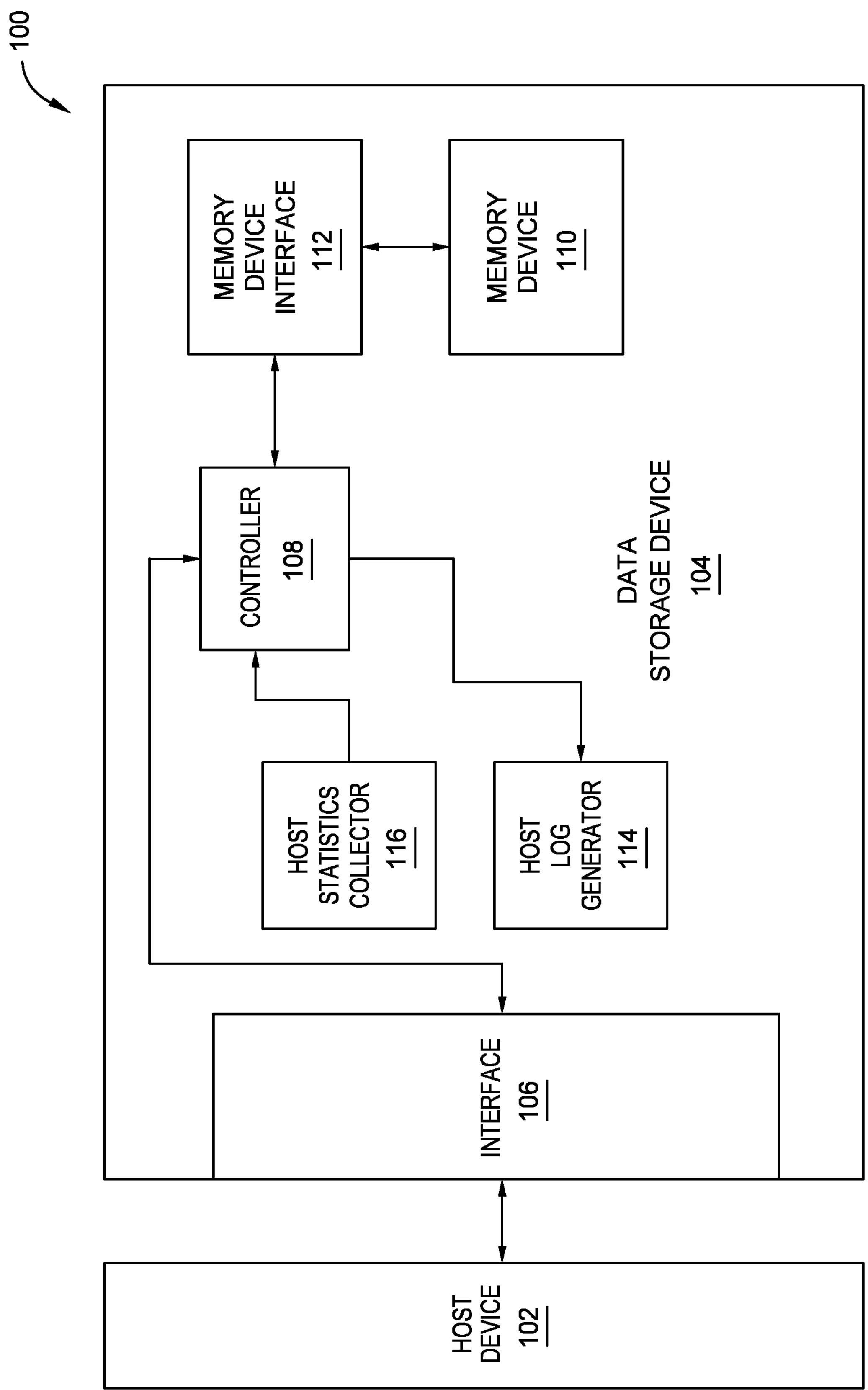
FIG. 1 is a schematic illustration of a system according to one embodiment.

FIG. 1 is a schematic illustration of a system 100 according to one embodiment. The system 100 includes a host device 102 that communicates with a data storage device 104 through an interface 105. The data storage device includes a controller 108 that communicates with one or more memory devices 110 through a memory device interface 112.

The disclosure herein describes dynamically changing predictive latency related attributes, as to allow adaptive maximization of the deterministic-window periods. Dynamically changing predictive latency related attributes is achieved by adaptively tracking the real-life current host device 102 workload characteristics and current memory device 110 (e.g., NAND) condition. The dynamic approach is in contrary to the static approach that uses rigid values which are fixed all along data storage device 104 lifetime, and which are set based on pessimistic assumption of memory device 110 end of life conditions on the one hand, and extreme host device 102 workloads on the other hand—that actually are representing the worst case scenarios.

The innovative concept proposed herein may be achieved by adding a designated logic hardware to the data storage device 104. The designated hardware logic will track both current host device 102 workloads and the current memory device 110 condition (as is reflected in the internal memory device 110 parameters). The designated logic hardware will produce accordingly dynamically updated values of the relevant attributes of the deterministic/non-deterministic windows. The updated values will be placed in the predictable latency per NVM get log page.

A host statistics collector 116 and a host log generator 114 are also coupled to the controller 108. The host statistics collector 116 gathers information or statistics on the host device 102 usage of the data storage device 104. Such information includes the intensity of memory usage by the host device 102. More specific information includes the workload from the host device 102 (i.e., write intensive/read intensive), sequential write and read composition, random write and read composition, FTL tables or address translation tables, and stream allocation of the host device 102. If the host device 102 works using streams or namespaces, the order is more easily maintained.

The current state of the memory devices 110 is also gathered. Such information gathered for the memory devices 110 includes the number of program/erase cycles, the range of temperature over a predetermined period of time, the remaining free space, and the bad block budget. In one embodiment, the predetermined period of time may be between about 1 ms to about 10 seconds.

The information gathered from the host statistics collector 116 as well as from the memory devices 110 is aggregated and used in part to determine the DTWIN duration and the frequency of background operations that will determine the NDWIN duration. The DTWIN duration and NDWIN duration is dynamic in that the DTWIN duration and NDWIN duration is constantly updated based upon changing conditions of the memory devices 110 and the host statistics found in in the host statistics collector 116. The DTWIN duration and NDWIN duration is updated and stored in the host log generator 114. As discussed herein, the DTWIN duration and NDWIN duration are not static, but rather, dynamically change based upon the information gathered.

Figure 2:
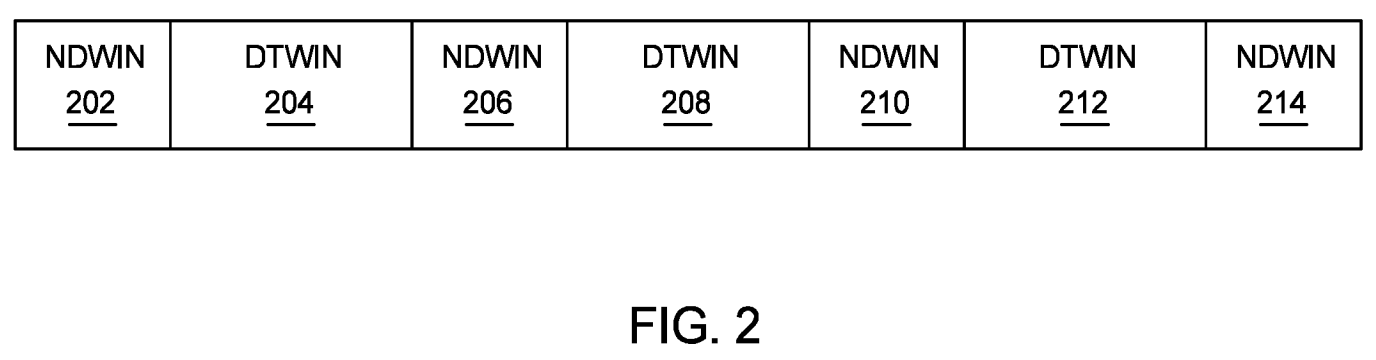

FIG. 2 is a schematic illustration of DTWIN duration and NDWIN duration according to one embodiment. As shown in FIG. 2, the DTWINs 204, 208, 212 alternate in time with the NDWINs 202, 206, 210, 214. In a static environment, the DTWINs 204, 208, 212 all have the same duration and never change. Similarly, the NDWINs 202, 206, 210, 214 all have the same duration in a static environment and never change. The reason that the duration of the DTWINs 204, 208, 212 and NDWINs 202, 206, 210, 214 never change in a static environment is that the data storage device has to assume the worst case scenario for operation and base the DTWIN duration and NDWIN duration on the worst case scenario. The worst case scenario from the memory device perspective is the EOL and the performance that accompanies EOL for the memory device. For the host device usage, a heavy workload is assumed. In that way, the data storage device has a fixed DTWIN duration and NDWIN duration that is stored in a get log table and provided to the host device. In a static environment, the data storage device has to assume the worst case scenario because the data storage device is not allowed to process front end actions for longer than the DTWIN duration. If any front end activity will exceed the DTWIN duration, then the data storage device cannot proceed and returns an error to the host device. Hence, in a static environment, the data storage device cannot advertise a DTWIN duration to the host device that is greater than the worst case scenario else the data storage device is subject to failure.

Figure 3:
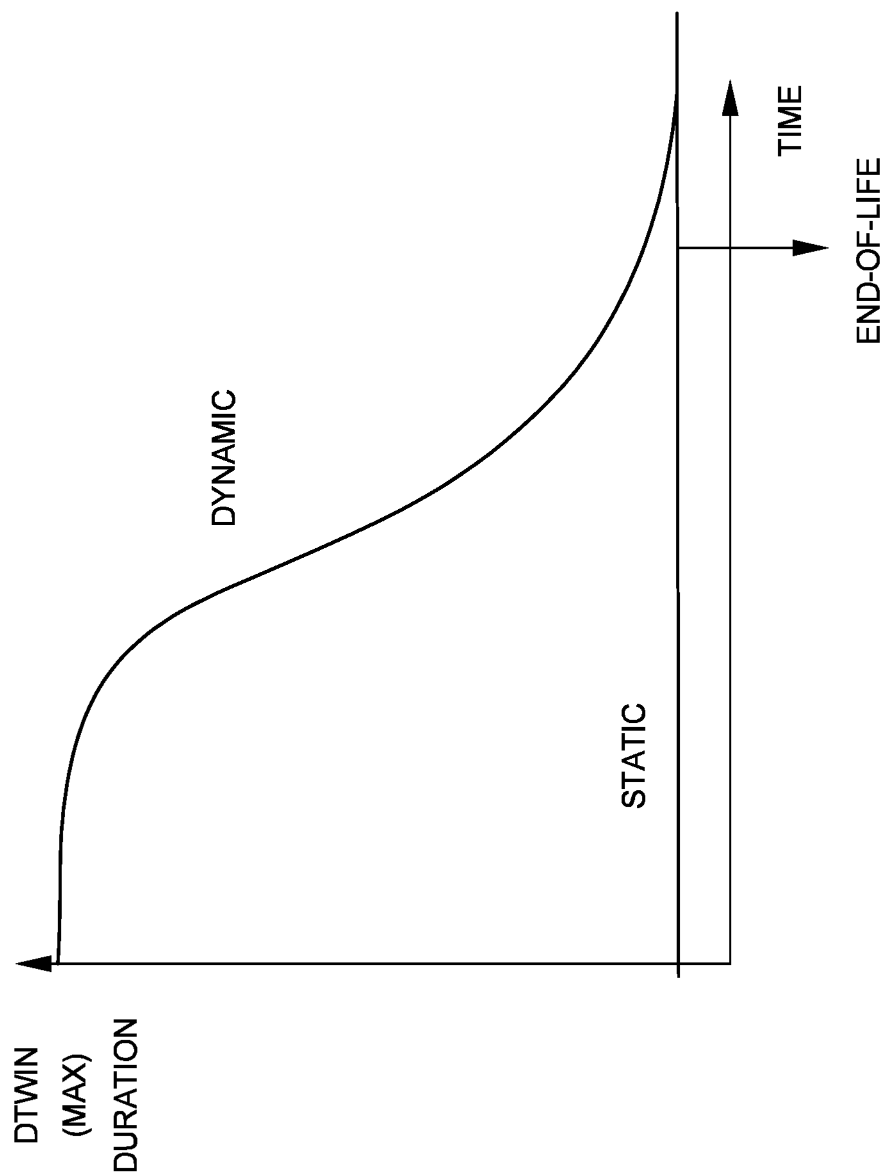
FIG. 3 is a graph illustrating the change in DTWIN duration over time.
Figure 4:
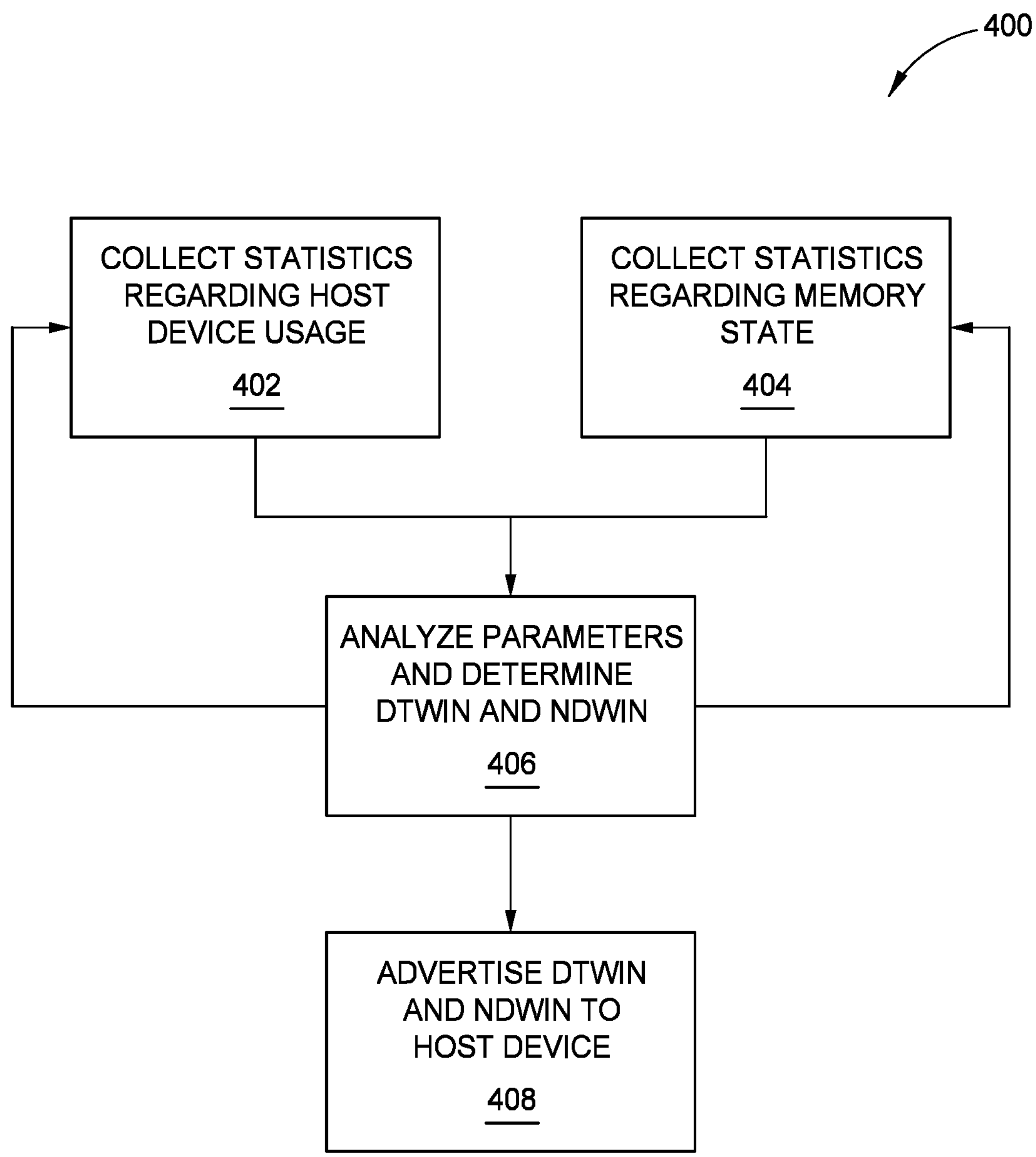
FIG. 4 is a flow chart illustrating a method of implementing DTWIN duration change.

FIG. 3 is a graph illustrating the change in DTWIN duration over time. As shown in FIG. 3, in a static situation, the DTWIN duration never changes and is set at the beginning to be the worst case scenario of the EOL of the data storage device. In a dynamic situation, however, the EOL performance will be the same for the DTWIN duration, but the path to the EOL of the data storage device results in a dynamic DTWIN duration. At the beginning of usage, the host device has had no interaction with the memory device, and the memory device has had no usage. Thus, the best possible performance for the memory device will be at the beginning of life. Hence, the best possible DTWIN duration will occur at the beginning of life for the memory device as reflected by the high DTWIN duration for the dynamic DTWIN duration. Over time, the memory device experiences some usage, and host device statistics are collected. Hence, over time, the DTWIN duration decreases. Eventually, the data storage device will reach the EOL conditions. As shown in FIG. 4, at the EOL of the data storage device, the DTWIN duration for the dynamic situation has finally reached the DTWIN duration advertised to host devices for static situations. Therefore, using a dynamic DTWIN duration dramatically increases the data storage device's DTWIN duration over the life of the data storage device as compared to a static DTWIN.

FIG. 4 is a flow chart illustrating a method 400 of implementing DTWIN change. The data storage device collects statistics regarding host device usage at 402 and also collects statistics regarding memory device state at 404. The collected statistics and then analyzed by the data storage device in 406 to determine the DTWIN and NDWIN duration. The data storage device then advertises the modified duration according to an update rule to a host device in 408. There are several possible triggering options for updating the get log table: update immediately when recalibration of the DTWIN duration happens; update upon the occurrence of the next power cycle; and update in set intervals such as when a predetermined time or predetermined number of DTWINs has passed.

In one embodiment, the update rule is determined by the host device. In another embodiment, the update rule is set by the data storage device. The data storage device constantly collects statistics and therefore constantly updates the DTWIN and NDWIN durations. The data storage device is therefore always ready to provide a new DTWIN and NDWIN duration to the host device at any time defined by either the host device or the data storage device.

In one embodiment, a system includes a single host device that communicates with a single, internal, non-removable data storage device. The DTWIN and NDWIN durations dynamically change over time and are communicated to the single host device.

In another embodiment, a single, removable data storage device communicates, at various times, with at least two host devices. While the data storage device statistics will be the same regardless of the host device, the DTWIN and NDWIN durations may be different for each host device since the workload triggered by each host device may be different. Hence, different DTWIN and NDWIN durations may be provided to each host device. Furthermore, the DTWIN and NDWIN durations dynamically change over time.

In another embodiment, a single data storage device communicates with at least two host devices. The communications may occur simultaneously or serially. While the data storage device statistics will be the same regardless of the host device, the DTWIN and NDWIN durations may be different for each host device since the workload triggered by each host device may be different. Hence, different DTWIN and NDWIN durations may be provided to each host device. Furthermore, the DTWIN and NDWIN durations dynamically change over time.

In another embodiment, multiple data storage devices communicate with a single host device. Both the data storage device statistics as well as the host device statistics may be different. The data storage device statistics can be different because of different usage by the host device for example. The host device statistics may be different as well if the host device uses the different data storage devices differently. Hence, different DTWIN and NDWIN durations for each data storage device may be provided to the host device. Furthermore, the DTWIN and NDWIN durations dynamically change over time.

In another embodiment, multiple host devices share multiple data storage devices and communicate therewith. Both the data storage device statistics as well as the host device statistics may be different. The data storage device statistics can be different because of different usage by the host device for example. The host device statistics may be different as well as each host device uses the different data storage devices differently. Hence, different DTWIN and NDWIN durations may be provided to each host device from each data storage device. Furthermore, the DTWIN and NDWIN durations dynamically change over time.

It is also contemplated that the memory devices can be logically arranged in sets, and the sets may change during the data storage device lifetime. FIG. 5 is a schematic illustration of a memory device set according to one embodiment. In the enterprise market, dies may be grouped together to take full advantage of the dynamic DTWIN duration. For example, if some dies reach the EOL conditions prior to others, the system may group those dies together in one set under common DTWIN and NDWIN durations as shown on FIG. 5.

In FIG. 5, three sets 500, 520, 540 are shown for exemplification purposes. The first set 500 includes NDWINs 502, 506, 510, 514 alternating with DTWINs 504, 508, 512. The NDWINs 502, 506, 510, 514 all have the same duration. Similarly, the DTWINs 504, 508, 512 all have the same duration.

The second set 520 includes NDWINs 522, 526, 530, 534 alternating with DTWINs 524, 528, 532. The NDWINs 522, 526, 530, 534 all have the same duration. Similarly, the DTWINs 524, 528, 532 all have the same duration.

The third set 540 includes NDWINs 542, 546, 550, 554 alternating with DTWINs 544, 548, 552. The NDWINs 542, 546, 550, 554 all have the same duration. Similarly, the DTWINs 544, 548, 552 all have the same duration.

As the data sets 500, 520, 540 are all logically arranged, the sets 500, 520, 540 can be logically arranged based upon quality of the memory devices. Furthermore, the sets 500, 520, 540 can be logically arranged to provide the best parameters for a specific request by the host device. Furthermore, each set 500, 520, 540 will have an individual get log table and different DTWIN and NDWIN duration. For example, the NDWINs 502, 506, 510, 514 of set 500 have a different duration than the NDWINs 522, 526, 530, 534 of set 520 and the NDWINs 542, 546, 550, 554 of set 540. Additionally, the NDWINs 522, 526, 530, 534 of set 520 have a different duration than the NDWINs 542, 546, 550, 554 of set 540. In regards to DTWIN, the DTWINs 504, 508, 512 of set 500 have a different duration than the DTWINs 524, 528, 532 of set 520 and the DTWINs 544, 548, 552 of set 540. Additionally, the DTWINs 524, 528, 532 of set 520 have a different duration than the DTWINs 544, 548, 552 of set 540. Based upon host statistics and/or memory device statistics, the memory devices can be logically rearranged into different sets to obtain the best DTWIN and NDWIN durations possible or simply to tailor the DTWIN and NDWIN durations to the needs of the host device.

In one embodiment, a data storage device comprises: at least one memory device; and a controller coupled to the at least one memory device, the controller configured to: collect statistics regarding host device usage of the data storage device; collect statistics regarding parameters of the at least one memory device; determine deterministic window (DTWIN) duration for the data storage device based upon the collected statistics; and deliver the DTWIN duration to at least one host device. The controller is further configured to change the DTWIN duration. The controller includes a host statistics collector that collects statistics regarding host device usage. The controller comprises a CPU that collects the statistics from the host device and from the at least one memory device. The statistics collected regarding host device usage include one or more of workload, sequential read or write composition, random read or write composition; FTL tables or address translation tables; and stream allocation. The statistics collected regarding the parameters of the at least one memory device include one or more of program-erase cycles, range of temperature over predetermined period of time, remaining free space, and bad block budget. The controller is configured to deliver the DTWIN duration upon receiving a request for DTWIN duration from at least one host device. The controller is further configured to analyze the statistics collected regarding host device usage and the parameters of the at least one memory device, and wherein the controller is further configured to determine DTWIN duration and non-deterministic window (NDWIN) duration. The controller is further configured to determine a different DTWIN duration for each host device for the at least one memory device. The different DTWIN duration is based upon host device usage statistics that are different for each host device. The different DTWIN durations is based upon identical statistics from parameters of the at least one memory device.

In another embodiment, a data storage device comprises: a plurality of memory devices; and a controller coupled to the plurality of memory devices, the controller configured to: logically arrange the plurality of memory devices into a first plurality of memory device sets; determine first deterministic window (DTWIN) duration for each memory device set of the first plurality of memory device sets; logically rearrange the plurality of memory devices into a second plurality of memory device sets; and determine a second DTWIN duration for each memory device set of the second plurality of memory device sets. At least one DTWIN duration for the first DTWIN durations is different from at least one other DTWIN duration for the first DTWIN durations. At least one DTWIN duration for the first DTWIN durations is different from at least one second DTWIN duration for the second DTWIN durations. At least one DTWIN duration for the second DTWIN durations is different from at least one other DTWIN duration for the second DTWIN durations. The controller is configured to deliver the second DTWIN durations upon determining the second DTWIN durations. The controller is further configured to adjust the first DTWIN duration to a third DTWIN duration for at least one memory device set prior to logically rearranging the plurality of memory devices. The controller is further configured to deliver the third DTWIN duration to a host device.

In another embodiment, a data storage device comprises: means to dynamically adjust deterministic window (DTWIN) duration for at least one memory device; and means to deliver the DTWIN duration to at least one host device. The at least one memory device is a plurality of memory devices logically arranged into a plurality of memory sets.

By continually collecting statistics of one or more of host device usage of the data storage device and the memory device performance, a dynamic DTWIN duration can be utilized that will adapt to the current state of memory device and host usage. Thus, QoS for the data storage device can be improved while the DWTIN can be decreased over time rather than remaining fixed.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:

at least one memory device; and a controller coupled to the at least one memory device, the controller configured to:

collect statistics regarding host device usage of the data storage device;

collect statistics regarding parameters of the at least one memory device;

reduce a deterministic window (DTWIN) duration for the data storage device based upon the collected statistics, wherein the DTWIN duration is a window of operation during which a deterministic latency for read operations and write operations is provided; and deliver the DTWIN duration to at least one host device.

2. The data storage device of claim 1, wherein the controller is further configured to change the DTWIN duration.

3. The data storage device of claim 1, wherein the controller includes a host statistics collector that collects statistics regarding host device usage.

4. The data storage device of claim 1, wherein the controller comprises a CPU that collects the statistics from the host device and from the at least one memory device.

5. The data storage device of claim 1, wherein the statistics collected regarding host device usage include one or more of workload, sequential read or write composition, random read or write composition; flash translation layer (FTL) tables or address translation tables; and stream allocation.

6. The data storage device of claim 1, wherein the statistics collected regarding the parameters of the at least one memory device include one or more of program-erase cycles, range of temperature over predetermined period of time, remaining free space, and bad block budget.

7. The data storage device of claim 1, wherein the controller is configured to deliver the DTWIN duration upon receiving a request for DTWIN duration from at least one host device.

8. The data storage device of claim 1, wherein the controller is further configured to analyze the statistics collected regarding host device usage and the parameters of the at least one memory device, and wherein the controller is further configured to reduce the DTWIN duration and a non-deterministic window (NDWIN) duration.

9. The data storage device of claim 1, wherein the controller is further configured to reduce a different DTWIN duration for each host device for the at least one memory device.

10. The data storage device of claim 9, wherein the different DTWIN duration is based upon host device usage statistics that are different for each host device.

11. The data storage device of claim 10, wherein the different DTWIN duration is based upon identical statistics from parameters of the at least one memory device.

12. A data storage device, comprising:

a plurality of memory devices; and a controller coupled to the plurality of memory devices, the controller configured to:

logically arrange the plurality of memory devices into a first plurality of memory device sets;

reduce a first deterministic window (DTWIN) duration for each memory device set of the first plurality of memory device sets, wherein a DTWIN duration is a window of operation during which a deterministic latency for read operations and write operations is provided;

logically rearrange the plurality of memory devices into a second plurality of memory device sets; and reduce a second DTWIN duration for each memory device set of the second plurality of memory device sets.

13. The data storage device of claim 12, wherein at least one DTWIN duration for the first DTWIN durations is different from at least one other DTWIN duration for the first DTWIN durations.

14. The data storage device of claim 12, wherein at least one DTWIN duration for the first DTWIN durations is different from at least one second DTWIN duration for the second DTWIN durations.

15. The data storage device of claim 12, wherein at least one DTWIN duration for the second DTWIN durations is different from at least one other DTWIN duration for the second DTWIN durations.

16. The data storage device of claim 12, wherein the controller is configured to deliver the second DTWIN durations upon determining the second DTWIN durations.

17. The data storage device of claim 12, wherein the controller is further configured to reduce the first DTWIN duration to a third DTWIN duration for at least one memory device set prior to logically rearranging the plurality of memory devices.

18. The data storage device of claim 17, wherein the controller is further configured to deliver the third DTWIN duration to a host device.

19. A data storage device, comprising:

means to dynamically reduce a deterministic window (DTWIN) duration for at least one memory device, wherein the DTWIN duration is a window of operation during which a deterministic latency for read operations and write operations is provided; and means to deliver the DTWIN duration to at least one host device.

20. The data storage device of claim 19, wherein the at least one memory device is a plurality of memory devices logically arranged into a plurality of memory sets.

* * * * *